United States Patent
Le Louarn et al.

(10) Patent No.: US 8,699,203 B2
(45) Date of Patent: Apr. 15, 2014

(54) SYSTEM FOR DISSIPATING A LIGHTNING CURRENT GENERATED BY A THUNDERSTORM DISCHARGE ON AN AIRCRAFT

(75) Inventors: Amelie Le Louarn, Tournefeuille (FR); Frederic Labal, Rouffiac-Tolosan (FR)

(73) Assignee: Airbus Operations S.A.S., Toulouse (FR)

( * ) Notice: Subject to any disclaimer, the term of this patent is extended or adjusted under 35 U.S.C. 154(b) by 477 days.

(21) Appl. No.: 12/999,423

(22) PCT Filed: Jun. 16, 2009

(86) PCT No.: PCT/FR2009/000720
§ 371 (c)(1),
(2), (4) Date: Feb. 14, 2011

(87) PCT Pub. No.: WO2009/153452
PCT Pub. Date: Dec. 23, 2009

(65) Prior Publication Data
US 2011/0141645 A1  Jun. 16, 2011

(30) Foreign Application Priority Data

Jun. 17, 2008  (FR) ...................... 08 53999

(51) Int. Cl.
*H02H 3/22* (2006.01)
(52) U.S. Cl.
USPC .......................................... 361/218; 361/117
(58) Field of Classification Search
None
See application file for complete search history.

(56) References Cited

U.S. PATENT DOCUMENTS

| 3,108,473 | A |   | 10/1963 | Serra et al. |
|-----------|---|---|---------|--------------|
| 3,755,713 | A | * | 8/1973  | Paszkowski ................. 361/218 |
| 4,479,163 | A | * | 10/1984 | Bannink et al. .............. 361/218 |
| 4,502,092 | A | * | 2/1985  | Bannink et al. .............. 361/218 |
| 4,755,904 | A | * | 7/1988  | Brick ........................... 361/117 |
| 4,796,153 | A | * | 1/1989  | Amason et al. ............... 361/218 |
| 4,824,713 | A | * | 4/1989  | Brick ........................... 428/144 |
| 4,888,451 | A |   | 12/1989 | Toni et al. |
| 5,461,534 | A | * | 10/1995 | Gondot et al. ............... 361/218 |
| 5,845,872 | A | * | 12/1998 | Pridham et al. .............. 244/1 A |
| 5,865,397 | A | * | 2/1999  | Herrmann ..................... 244/14 |

(Continued)

FOREIGN PATENT DOCUMENTS

EP  0 900 647   3/1999
EP  1 491 900  12/2004

OTHER PUBLICATIONS

International Search Report issued Dec. 10, 2009 in PCT/FR09/000720 filed Jun. 16, 2009.

*Primary Examiner* — Rexford Barnie
*Assistant Examiner* — Angela Brooks
(74) *Attorney, Agent, or Firm* — Oblon, Spivak, McCelland, Maier & Neustadt, L.L.P.

(57) ABSTRACT

A system for dissipating a lightning current produced by a thunderstorm discharge on an avionic equipment installed on the external skin of an aircraft, the external skin being made of a composite material covered with a layer of expanded metal and including an orifice in which there is positioned an aerodynamic plate covering the avionic equipment. The aerodynamic plate is attached to the external skin by a doubler. The system includes at least one metal plate at least partially surrounding the aerodynamic plate and mounted so as to ensure electrical continuity between the doubler and the layer of expanded metal so as to dissipate the lightning current into the layer of expanded metal.

10 Claims, 5 Drawing Sheets

(56) References Cited

U.S. PATENT DOCUMENTS

| | | | |
|---|---|---|---|
| 6,086,975 A * | 7/2000 | Brick et al. | 428/116 |
| 6,327,132 B1 * | 12/2001 | Andrivet et al. | 361/218 |
| 7,307,825 B2 * | 12/2007 | De La Fuente De Ana et al. | 361/212 |
| 7,554,785 B2 * | 6/2009 | Hawley | 361/218 |
| 8,282,042 B2 * | 10/2012 | Parikh et al. | 244/132 |
| 8,413,929 B2 * | 4/2013 | Kamino et al. | 244/132 |
| 2004/0261518 A1 | 12/2004 | Seidel et al. | |
| 2005/0103936 A1 * | 5/2005 | Pridham et al. | 244/119 |
| 2007/0177330 A1 * | 8/2007 | Ackerman et al. | 361/220 |
| 2008/0170349 A1 * | 7/2008 | Stein | 361/218 |
| 2009/0060666 A1 * | 3/2009 | Georgeson et al. | 408/16 |
| 2009/0092844 A1 * | 4/2009 | Ware et al. | 428/457 |
| 2009/0159306 A1 * | 6/2009 | Loche et al. | 174/2 |
| 2010/0089608 A1 * | 4/2010 | Orgaz Villegas et al. | 174/78 |
| 2010/0320315 A1 * | 12/2010 | Kashiwagi et al. | 244/1 A |
| 2011/0259999 A1 * | 10/2011 | Therond et al. | 244/1 A |
| 2012/0126054 A1 * | 5/2012 | Murciano et al. | 244/1 A |
| 2012/0236457 A1 * | 9/2012 | Yamakoshi et al. | 361/218 |
| 2013/0043342 A1 * | 2/2013 | Nordin et al. | 244/1 A |

* cited by examiner

SYSTEM FOR DISSIPATING A LIGHTNING CURRENT GENERATED BY A THUNDERSTORM DISCHARGE ON AN AIRCRAFT

FIELD OF THE INVENTION

The invention relates to a system for dissipating a lightning current produced by a thunderstorm discharge on an aircraft made of composite material. The invention also relates to a method for installation of this dissipating system.

The invention finds applications in the field of aeronautics and, in particular, in the field of protection of aircraft and equipment items installed on the skin of the aircraft.

STATE OF THE ART

Usually, the structure of an aircraft (fuselage, nose cone, wing group, etc.) is made from metal panels mounted and fastened around an inner structure also metal. These metal panels are assembled with fastenings likewise metal and, once assembled, form the outer skin of the aircraft, also called airplane skin.

On this outer skin, there generally are installed avionic equipment items, also called electronic equipment items, such as anemometric sensors, icing-condition detectors, radio antennas, navigation antennas, signal lights, outside lamps, etc. Each of these equipment items has a specific function. For example, the antennas installed on the outer skin of the aircraft contribute to the operation of the radiofrequency systems and the navigation systems of the aircraft, the icing-condition detectors detect the climatic conditions favoring the creation of ice in order to so inform the cockpit, the anemometric sensors (static pressure ports, Pitot sensors, etc.) measure parameters (of pressure, temperature, angle of incidence, etc.) in order to provide navigation information items to the cockpit (altitude, speed, etc.) . . . .

These equipment items must be installed outside the aircraft. They are mounted on a metal support, called reinforcement plate. The installation of these equipment items on the outer skin of the aircraft presents different constraints, namely:
- aerodynamic constraints that must be respected in order not to disrupt the performances of the equipment items and not to create parasitic drags;
- metalization constraints that must be respected in order that damage to the structure may be acceptable with regard to certification and maintenance requirements (in terms of safety, repair cost, cost of down-time of the aircraft, etc.);
- constraints that are linked to protection against the indirect effects of lightning in order to limit the transfer of a lightning current through the electric network connected to these equipment items.

In fact, the probability that an aircraft takes lightning in flight is equal to 1 per 1000 hours of flight, in the areas of the world with the most lightning strikes. It therefore is understood that, in order to protect the aircraft as well as the personnel and the passengers aboard the aircraft, it is important to protect the entirety of the aircraft and the avionic equipment items, from lightning current that might damage same.

For that purpose, it is known, as for any electric system to be protected from lightning, to place all the equipment items of the aircraft at the same electric potential and to metalize all these equipment items to the metal components of the said aircraft, in order to dissipate the direct or indirect currents of lightning. There is understood by "metalize" the action of ensuring an electric continuity in order to place a set of components at the same electric potential.

In standard aircraft, that is to say with metal structure, the metal structure offers the advantage of performing a Faraday cage function when the airplane takes lightning in flight. It is known, in fact, that a Faraday cage is an enclosure impervious to electric fields which protects the inside of the enclosure from electric pollution. It therefore is understood that, when the structure of the aircraft is metal and the avionic equipment items installed outside this structure also are metal and fastened on the structure by means of metal fasteners, then the structure of the aircraft constitutes a Faraday cage. In this type of aircraft with metal structure, the outer skin itself serves to dissipate lightning currents.

Figure 1A:
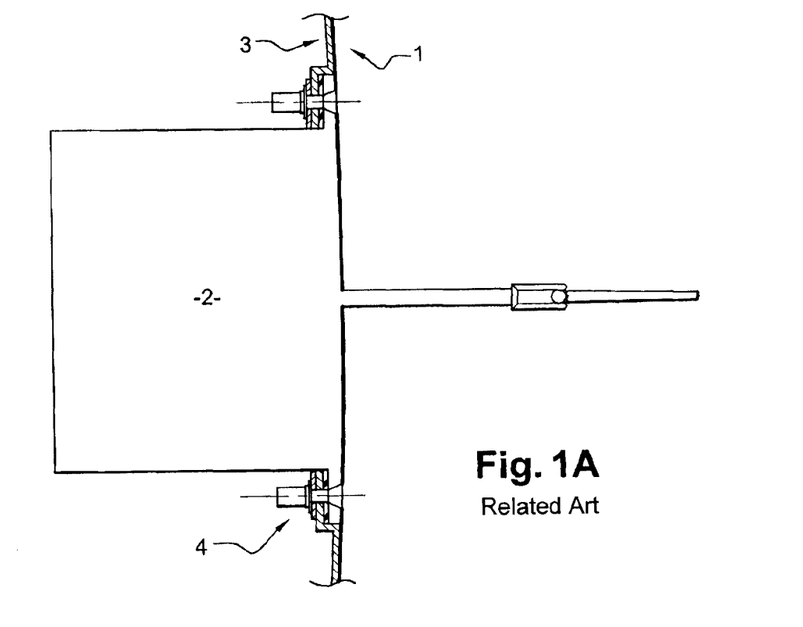
FIGS. 1A and 1B represent an exemplary system for dissipating the lightning current on an aircraft with metal structure.
Figure 1B:
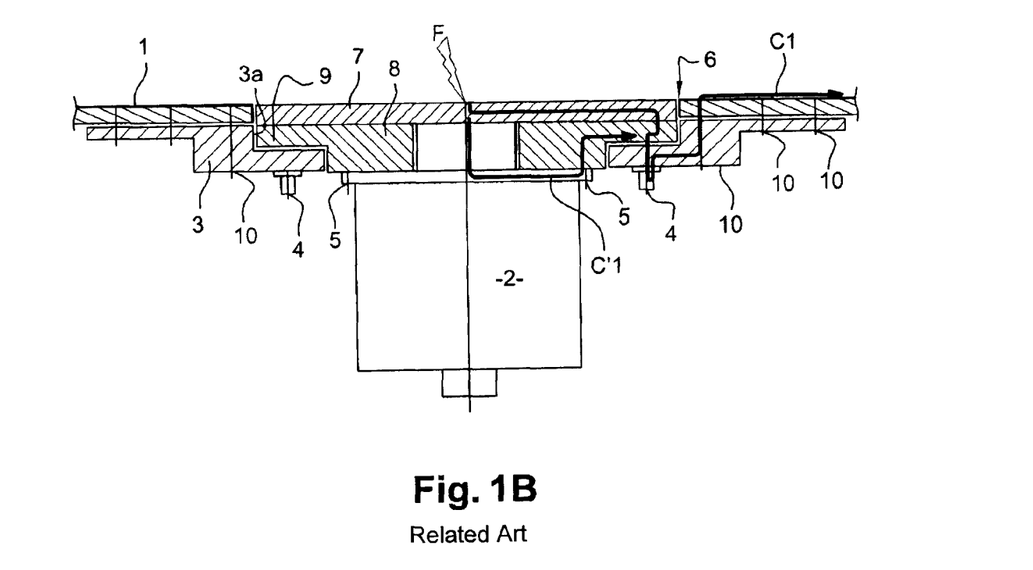

An exemplary avionic equipment item installed on the outer skin of an aircraft with metal structure has been shown on FIGS. 1A and 1B. This avionic equipment item is, for example, a sensor 2 mounted with an aerodynamic plate 7 intended to close up orifice 6 and to ensure a continuity of the profile of the aircraft. Sensor 2 is fastened on metal skin 1 of the aircraft by means of floating rivet nuts 4 and reinforcement plates 3 to 8. Among the reinforcement plates, there is a first metal plate 8, called intermediate plate, and a second metal plate 3, called reinforcement or doubler. More precisely, sensor 2 is fastened on intermediate plate 8, the function of which is to ensure a replaceability of sensor 2 via the outside of the aircraft. Intermediate plate 8 itself is fastened to doubler 3, the function of which is to reinforce structural orifice 6 through which sensor 2 passes. The doubler is placed beneath outer skin 1. It has a step shape. Intermediate plate 8 has a shape complementary to doubler 3. It is overlapping between doubler 3, sensor 2 and aerodynamic plate 7.

In this example, sensor 2 is held on intermediate plate 8 by metal screws 5. Aerodynamic plate 7 is fastened by metal screws 9 on intermediate plate 8. As for doubler 3, it is riveted on metal skin 1 of the aircraft. Doubler 3 furthermore is fastened on metal skin 1 by screws 10. In this way, the sensor is "metalized" to the skin of the aircraft, that is to say that it forms with the doubler, the skin, the metal plates, the metal screws and the floating nuts, a continuous metal, therefore electrically conductive, assembly.

It thus is understood that, in this example, the entire outer structure of the aircraft, of the sensor as far as the skin, is metalized. In this way, if the sensor is struck by lightning F, as schematized on FIG. 1B, the electric current generated by the lightning is going to follow a course corresponding to paths C1 and C1' drawn and marked with arrows on FIG. 1B. For example, if the sensor receives a current of lightning F, this current is going to pass through two possible paths:
- either through C1, that is to say through aerodynamic plate 7, then fastening screws 9, intermediate plate 8, floating nuts 4, doubler 3 and finally through screws 10 all the way into metal skin 1;
- or through C1', that is to say through aerodynamic plate 7, sensor 2, screws 5, intermediate plate 8, floating nuts 4, doubler 3 and screws 10 and finally metal skin 1.

In this way the lightning current is dissipated by the metal parts located near the sensor toward the outer skin of the aircraft, so that very little of the electric current is injected into the inside of the aircraft.

Aircraft with metal structure, however, have the drawback of being heavy, since the entirety of the structure is metal, with metal panels at least partially superposed in order to allow their assembly with metal joinings, which constitutes metal, therefore heavy, allowances. In order to reduce the structural mass of an aircraft, aeronautical manufacturers have sought to replace certain metal components with components made of composite materials. In particular, they have replaced a part of the metal structure of the aircraft with an equivalent made of composite material. A great number of present-day aircraft thus have a part of their structure, and in particular their outer skin, made of composite material. In fact, since composite materials have the advantage of being relatively light in relation to metal, the total mass of an aircraft with composite structure is significantly lightened in relation to that of a standard aircraft. Moreover, aircraft with composite structure have the advantage of requiring fewer inspections during their lifetime because their structure does not corrode.

The parts of the aircraft made of composite material generally are made from sheets of dry fibers pre-coated with a thermosetting resin. The sheets of pre-coated fibers are placed in a mold, then heated. Under the effect of the heat, the resin polymerizes, allowing the fibrous reinforcement to retain the shape of the mold. After cooling, the mold is removed.

With a structure made of composite material, however, metalization of the avionic equipment items is not ensured by the skin itself. In fact, it is clearly understood that the principle of metalization of avionic equipment items on a metal skin cannot be applied on an airplane made of composite material since the skin made of composite material is not electrically conductive. Aeronautical manufacturers therefore have sought to metalize the electronic equipment with the structure of the aircraft. For that purpose, on certain types of aircraft, in particular helicopters, a layer of expanded metal is placed above the skin made of composite material.

Figure 2:
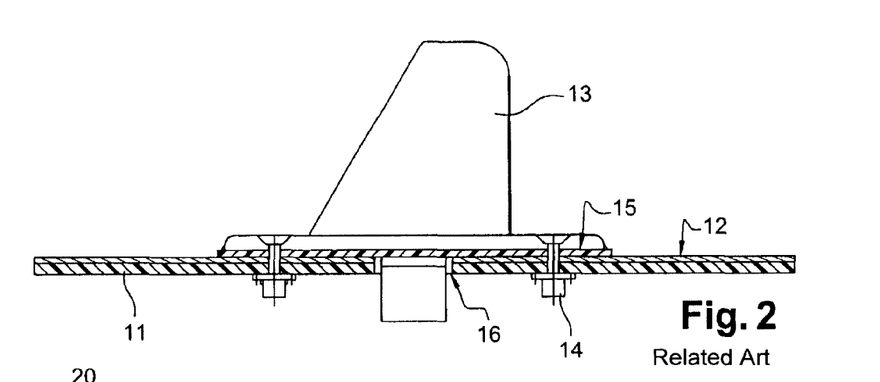
FIG. 2 shows an exemplary system for dissipating the lightning current, on an aircraft with composite structure, with a face-to-face metallization.

An exemplary aircraft structure made of composite material and expanded metal has been shown on FIG. 2. This structure comprises an outer skin made of composite material 11 on the outside of which is placed a layer of expanded metal 12, also called ECF for Expanded Copper Foil, or a layer of metal netting, In the remainder of the description, expanded metal will be mentioned, its being understood that it also may involve metal netting.

There is called "expanded metal" a metal plate, for example made of copper, drilled with a multitude of orifices then stretched so as to form a kind of grid. This expanded metal is spread over the structure made of composite material, thus forming a layer of expanded metal. This expanded metal may be laid at the same time as the composite skin, during manufacture of the structure of the aircraft. In this case, the expanded metal is cast with the carbon folds of the structure made of composite material. This expanded metal is added in order to dissipate the electric currents generated by lightning, so as to provide the same function as the skin of a metal aircraft in case of lightning.

As explained above, it is imperative to limit the injection of the lightning current into the inside metal network of the aircraft. In fact, this inside metal network provides electric reference and current return functions for the equipment items. It therefore is necessary to limit the injection of lightning currents into the inside of the airplane in order to avoid creating overvoltages and damaging the equipment items.

In this example, avionic equipment item 13, for example an antenna, is mounted inside an orifice 16 implemented in the outer skin 11. Avionic equipment item 13 is fastened on outer skin 11 by means of floating rivet nuts 14.

In such a structure, the avionic equipment item is metalized "face-to-face" with the expanded metal. In fact, the metallization between expanded metal layer 12 and avionic equipment item 13 is obtained by a plane-on-plane contact of the two components. Now, this plane-on-plane contact entails drawbacks.

In fact, as explained above, one of the face-to-face surfaces is not plane. An intermediate part, such as a sealing joint, which hinders electric passage, therefore generally is necessary. The result is an unreliable contact and a risk of corrosion that may hinder electric passage and lead to degradation of the protection against lightning. This risk is high for the following reasons:

it is difficult to guarantee a durable sealing between the electronic equipment items and the skin as a result of the curvature of the fuselage;

over large surfaces, difficulties exist for controlling the galvanic element between the materials (in particular aluminum and carbon). In fact, the treatment of this galvanic element requires insulating elements or semi-conductors to ensure sealing, which are incompatible with the requirements for protection against the direct effects of lightning, namely a minimal metal/metal surface contact of 400 $mm^2$ and an electric resistance of 5 milliohms between the equipment item and the layer of expanded metal.

Now, in the case of poor metallization of the assembly, the lightning current would pass into the avionic equipment item then would be evacuated by the electric cable and the pneumatic pipe connected to the said equipment. The risks then would be, on the one hand, of damaging the equipment item and, on the other hand, of damaging the electric or electromechanical equipment items connected to the ends of the electric cables.

The structure of FIG. 2 also has the drawback of not being able to reuse the equipment items of the preceding programs. In fact, the avionic equipment items described for a metal airplane cannot be reused on a composite fuselage because the metalization device is modified.

Still another drawback relates to maintenance in cost and in repair time. In fact, the repair of the lightning protection between the electronic equipment item and the structure of the aircraft requires dismantling of the equipment, which entails a considerable repair time and therefore a considerable down-time cost.

EXPLANATION OF THE INVENTION

The invention precisely has as an object to propose a dissipating system for an aircraft made of composite material which makes it possible to dissipate the electric current generated by lightning in the expanded metal layer.

In fact it therefore is essential that the avionic equipment items mounted on the skin of the aircraft be metalized with the layer of expanded metal in order that the lightning current may be dissipated by the metal mesh outside the skin so as not to penetrate into the inside network of the aircraft. The dissipating system of the invention guarantees a very good electric continuity, with sufficient contact surfaces, between the equipment item and the expanded metal, while respecting restricting aerodynamic requirements such as the non-alignment between the avionic equipment item and the airplane skin.

More precisely, the invention relates to a system for dissipating a lightning current produced by a thunderstorm discharge on an avionic equipment item installed on an outer skin of an aircraft, the said outer skin being made of a composite material covered with a layer of expanded metal and comprising an orifice in which there is positioned an aerodynamic plate covering the avionic equipment item, the said aerodynamic plate being fastened on the outer skin by means of a doubler, characterized in that it comprises at least one metal plate at least partially surrounding the aerodynamic plate and mounted so as to ensure an electric continuity between the doubler and the layer of expanded metal in order to ensure a dissipating of the lightning current in the layer of expanded metal.

The invention may comprise one or more of the following characteristics:
  the metal plate is a plate made of expanded metal.
  the plate made of expanded metal is arranged so as to cover at least partially both the upper face of the outer skin and a lower face of the said outer skin.
  the plate made of expanded metal is partially covered with a ring-shaped plate made of titanium or of copper.
  the metal plate is a plate made of titanium cast with the outer skin.
  the plate made of titanium is fastened on the doubler by means of metals screws.
  the plate made of expanded metal is pre-impregnated with resin and fastened on the outer skin by heating.
  it comprises at least one laminated shim positioned between the metal plate and the outer skin in order to correct an aerodynamic non-alignment between the upper surface of the outer skin and the aerodynamic equipment item.

The invention also relates to a method for installation of the dissipating system described above. This method comprises the following operations:
  implementation of an orifice in the outer skin of the aircraft,
  installation of a metal plate around at least one part of this orifice,
  fastening of this metal plate on the outer skin and on a doubler, and
  installation of an avionic equipment item in the orifice.

The invention also relates to an aircraft characterized in that it comprises a dissipating system such as described above.

DETAILED DESCRIPTION OF EMBODIMENTS OF THE INVENTION

In the dissipating system of the invention, an electrically conductive metal plate is installed at least partially around the aerodynamic plate. This metal plate is mounted so as to ensure an electric contact between the doubler and the expanded metal of the airplane skin so as to allow an electric continuity between the avionic equipment item and the expanded metal. This electric continuity makes it possible to ensure the evacuation of the lightning current toward the layer of expanded metal.

Figure 3:
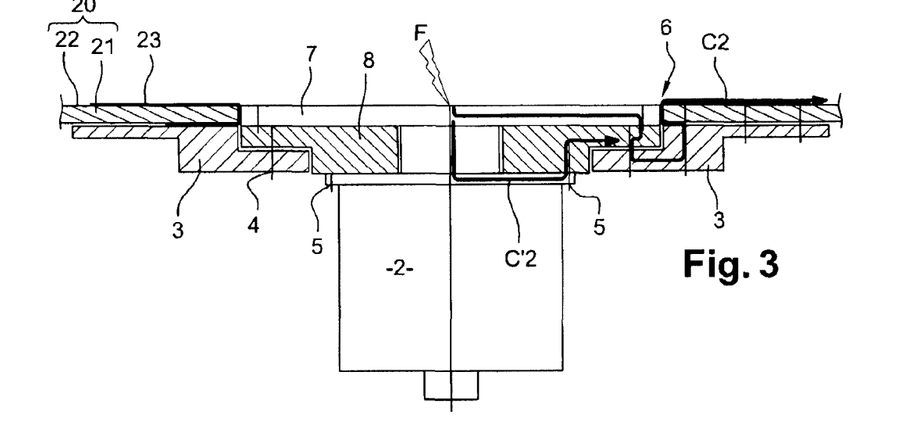
FIG. 3 shows an exemplary system for dissipating the lightning current, on an aircraft with composite structure, according to a first embodiment of the invention.

This metal plate may be in several forms. In a first embodiment of the invention, shown on FIG. 3, the metal plate is a plate made of expanded metal. More precisely, this FIG. 3 shows an exemplary installation of an avionic equipment item on an aircraft structure made of composite material, according to a first embodiment. In this example, the avionic equipment item, also called electronic equipment item, is an anemometric sensor 2.

In this embodiment, the expanded metal plate 23 is installed partially around orifice 6 for passage of sensor 2. This expanded metal plate 23 is positioned to as to surround airplane-skin 20 over its entire thickness. As shown on FIG. 3A, expanded metal plate 23, also called additional ECF, is applied on the outside surface of airplane-skin 20, above the layer of expanded metal 22 covering composite material 21. There is referred to as outside surface, or upper surface, of the airplane-skin, the surface of the skin located outside the aircraft, as opposed to the inside surface, or lower surface. Expanded metal plate 23 also is applied on the walls of orifice 6 and on the inside surface of airplane-skin 20. In this way, in the vicinity of orifice 6, airplane-skin 20 is sandwiched in expanded metal plate 23.

In this embodiment, expanded metal plate 23 preferably is pre-impregnated with a resin capable of polymerizing to the airplane skin under the effect of a heating at 180 degrees, for two hours, under vacuum. It is to be noted that other types of resins may be used which polymerize at 80° C., for 2 hours, under vacuum.

It also is conceivable to use a dry expanded metal plate. In this case, it is necessary to apply a film of resin, then the expanded metal and to put it on to heat under pressure.

To produce the dissipating system according to this first embodiment, airplane-skin 20 made of composite materials according to standard techniques is drilled with an orifice 6 in order to allow passage of sensor 2. A pre-impregnated expanded metal plate is positioned around orifice 6 then applied on the walls of the said orifice then underneath the orifice. In this way the expanded metal plate covers the outside surface of the airplane-skin and its inside surface. A heating mat brought to approximately 180° C. then is installed on this expanded metal plate to ensure polymerization thereof.

In more detailed manner, a sanding operation may be performed prior to installing expanded metal plate 23, so as to achieve the metal mesh of the layer of expanded metal 22.

In this way expanded metal plate 23 is in surface contact with the layer of expanded metal 22 of the airplane skin. Expanded metal plate 23 also is in surface contact, inside the aircraft, with doubler 3.

In this embodiment, metalization of the installation therefore is ensured via airplane-skin 20. In fact, sensor 2 is metalized with doubler 3, as explained above for the aircraft with metal structure, through intermediate plate 8, aerodynamic plate 7 and screws and nuts 5 and 4. Doubler 3 is metalized by contact with expanded metal plate 23, itself metalized by contact with the layer of expanded metal 22 of the airplane skin.

There have been shown on FIG. 3, exemplary courses C2 and C2' of lightning in the dissipating system that has just been described. In this way it is seen that if lightning F reaches sensor 2, then the lightning current is going to pass through two possible paths:

either through C2, that is to say through aerodynamic plate 7, then the fastening screws, intermediate plate 8, floating nuts 4, doubler 3 and finally through expanded metal plate 23, and lastly the layer of expanded metal 22 of airplane-skin 20;

or via C2', that is to say via aerodynamic plate 7, sensor 2, screw 5, intermediate plate 8, floating screws 4, doubler 3, expanded metal plate 23 and lastly layer of expanded metal 22 of airplane skin 20.

Irrespective of the course of the lightning current, the latter is dissipated toward the skin of the aircraft, avoiding any risk of introduction of the said current into the network of the aircraft.

Figure 4:
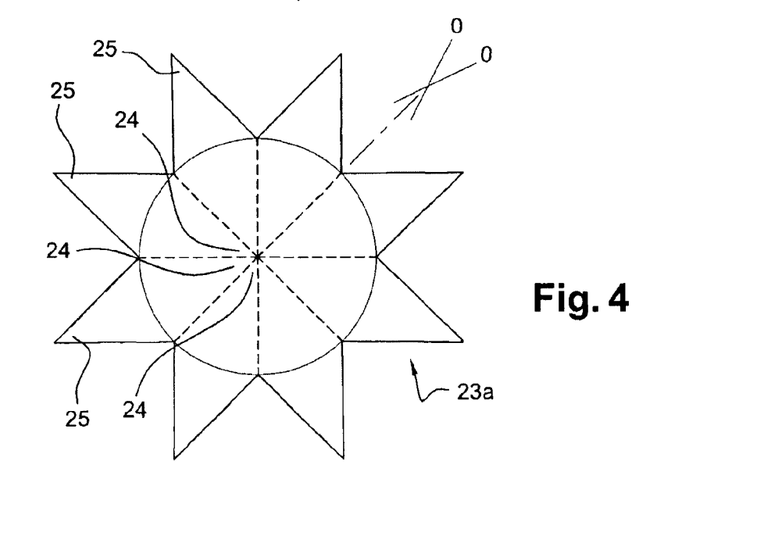
FIG. 4 shows an exemplary metal plate according to the first embodiment of the invention.

In a variant of this embodiment, the expanded metal plate has the form of a star 23a the center of which is cut out, as shown on FIG. 4. In this exemplary expanded metal plate 23a, the outer points 25 of the star are applied on the outside surface of the airplane-skin and the inner points 24, once cut out, are folded over on the inside surface of the airplane-skin. In this manner, once this expanded metal plate 23a is folded and heated, the expanded metal is distributed evenly all around orifice 6 in which sensor 2 is installed.

In a second variant of this embodiment, expanded metal plate 23 has a different form from that of FIG. 4. In this variant, expanded metal plate 23 is made up of a plurality of individual patches positioned close to each other. A pre-cut-out form intended to be folded at its center before being applied on the airplane skin is called an expanded metal patch. An example of such patches has been shown on FIGS. 5A to 5C. An exemplary patch, before and after folding, has been shown on FIG. 5B. Each patch 23b has a flat double blade shape, one half 27 of which is intended to be applied on the upper surface of airplane-skin 20 and the other half 26 on the lower face of the said airplane skin.

Figure 5A:
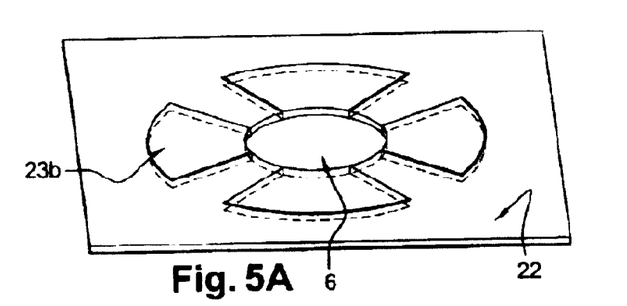
FIGS. 5A, 5B, 5C show another exemplary metal plate according to the first embodiment of the invention.
Figure 5B:
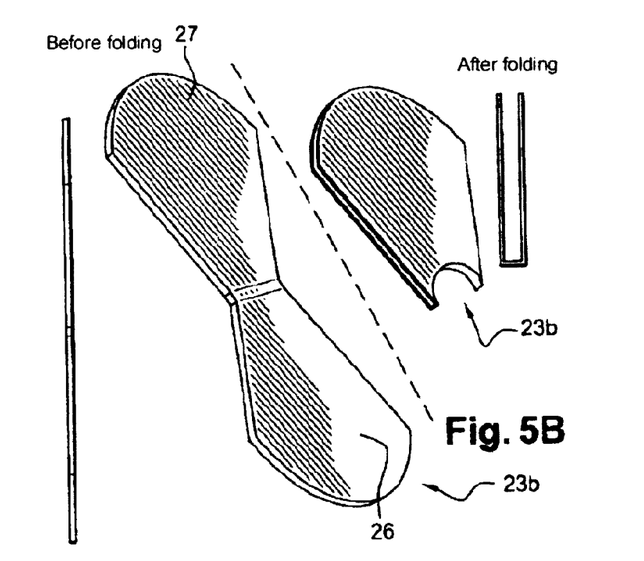
Figure 5C:
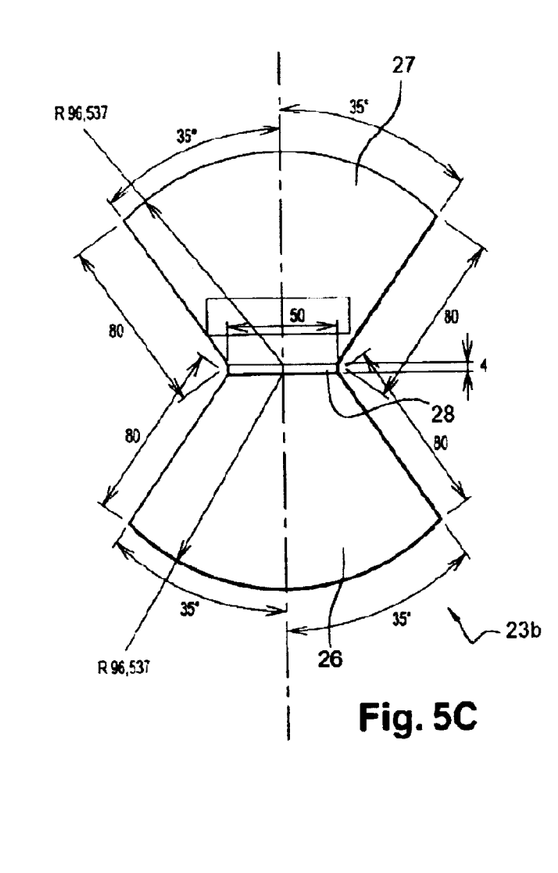

As shown on FIG. 5A, each patch 23b is positioned around passage orifice 6 for the sensor then folded toward the inside of the aircraft so that the patch follows a part of the circumference of orifice 6. Several patches, for example 4, are positioned around the orifice, as shown on FIG. 5A.

Each of the patches is installed, as in the first variant, with a sanding of the surface of the airplane-skin. All the patches then are heated by means of a heating mat.

In general, on an aircraft, a 400 $mm^2$ section as section for passage of the lightning current must be respected for reasons of safety. In order to respect this requirement, the sizing of a patch may be that shown on FIG. 5C. For example, each patch 23b may have a central section 28 of 50 mm by 4 mm (50 mm being the width) and sides of 80 mm, with an opening of 70°.

In this case, for an orifice 6 of 120 mm in diameter, four patches 23b may be used, as shown on FIG. 5A. At the edge of orifice 6, for each patch, there thus is 50 mm×4 mm=200 $mm^2$ of section for passage of the current. With four patches, there is thus 800 $mm^2$ for passage of the current.

If the thickness of the airplane skin decreases to 2 mm, the four patches provide 400 $mm^2$ of passage. If the skin thickness decreases from 1.5 mm, the width of section 28 of the patch is to be 70 mm; it also is possible, in this case, to add a further patch with section equal to 50 mm.

Such a sizing of patches makes it possible not only to respect the 400 $mm^2$ section for passage of the current, but also to apply the expanded metal patches at the edge of orifice 6 without creating a fold. In fact, in order not to create aerodynamic disturbances, it is necessary that there be no fold at the bend of the patches. In order to avoid the creation of folds during application of the expanded metal patches at the edge of the orifice, it is preferable that the central section of each patch does not exceed 50 mm.

It is to be noted that that, on aircraft, there are aerodynamic constraints relating to the non-alignment of the avionic equipment items in relation to the airplane-skin. For all the anemometric sensors and icing-condition detectors to be installed, the aerodynamic non-alignment between the equipment item and the airplane-skin must not vary by more than 0.2 mm to 0.8 mm. In fact, the acceptable non-alignment between the avionic equipment item and the structure of the aircraft depends on the type of the equipment item itself. For example, for static pressure sensors, the acceptable non-alignment ranges between 0.2 and 0.25 mm. This non-alignment depends on the performance of the equipment item itself.

In the embodiment that has just been described, the thickness of the airplane skin has the advantage of remaining constant, which makes it possible to respect the non-alignment constraints (acceptable non-alignment of approximately 0.2 mm, in the case of an anemometric sensor).

Moreover, in this embodiment, the expanded metal plate is located and installed after manufacture of the skin and before installation of the avionic equipment item, which makes it possible to retain the same avionic equipment item and the same installation process as for aircraft with metal structure.

In a second embodiment of the invention, the metal plate is made of an expanded metal ring and a ring-shaped plate made of titanium or copper. An example of this embodiment is shown on FIG. 6.

As in the first embodiment, airplane-skin 20 first is manufactured, then drilled with an orifice 6.

Figure 6:
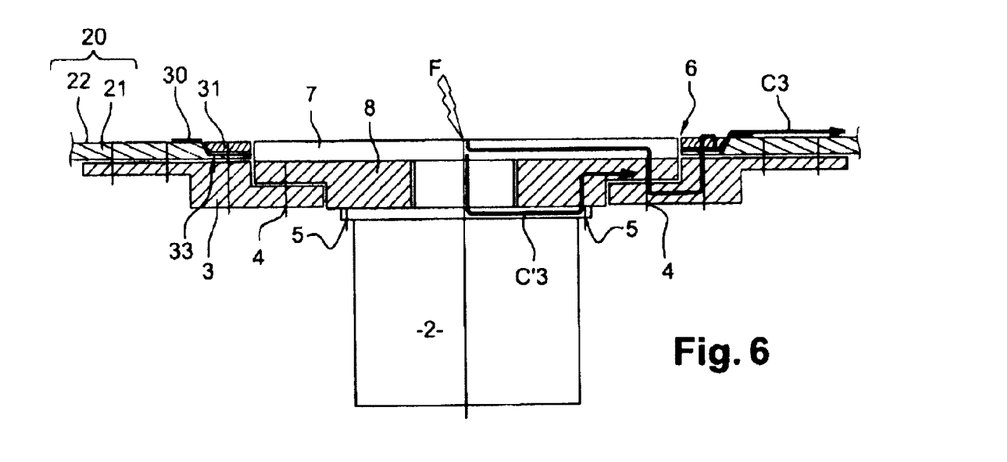
FIG. 6 shows an exemplary system for dissipating the lightning current, on an aircraft with composite structure, according to a second embodiment of the invention.

In this second embodiment, an expanded metal ring 30, pre-impregnated, then is installed around orifice 6, on the outside surface of airplane-skin 20. A heating mat then is placed on this ring 30 to ensure its polymerization.

Figure 7:
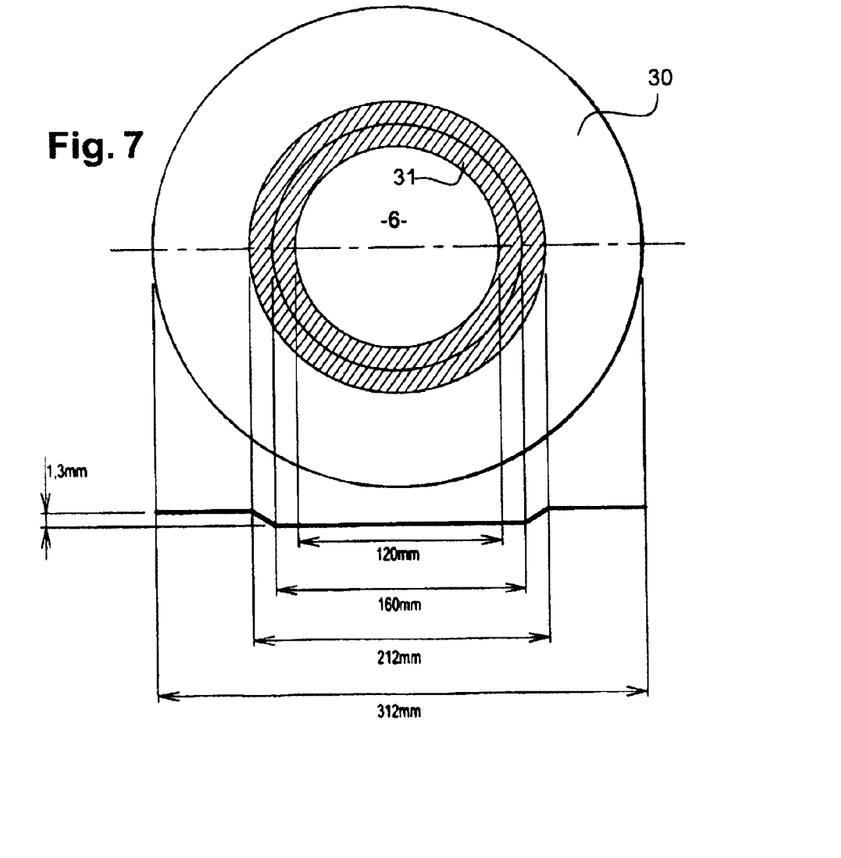
FIG. 7 shows an exemplary metal plate according to the second embodiment of the invention.

A ring-shaped plate 31, made of titanium or of copper, then is placed in contact with expanded metal ring 30. The embodiment with a plate made of titanium will be described subsequently, its being understood that plate 31 also may be made of copper. This titanium plate 31 is installed above the central section of expanded metal ring 30. An exemplary assembly of the metal plate according to this second embodiment is shown on FIG. 7. This assembly comprises a first ring 30 made of expanded metal. In the center of this ring, that is to say on the small-section zone of ring 30, a ring-shaped titanium plate 31 is positioned. This titanium plate 31 partially covers expanded metal ring 30. By way of indication, in order to respect the 400 $mm^2$ section for passage of the current of lightning, ring 30 may have an outside diameter of 312 mm and an inside diameter of 120 mm; titanium plate 31 may have an outside diameter of 212 mm and an inside diameter of 120 mm.

In this embodiment, ring-shaped plate made of titanium 31 is fastened on doubler 3 with screws 32. These screws metalize doubler 3 to the plate made of titanium 31. The plate made of titanium is metalized to the ring made of expanded metal. In this way, the entire assembly is metalized to the expanded metal layer of the airplane-skin.

Exemplary courses C3 and C3' of the lightning in the dissipating system that has just been described have been shown on FIG. 6. It thus is seen that if lightning F reaches sensor 2, then the lightning current is going to pass through two possible paths:

either through C3, that is to say through aerodynamic plate 7, intermediate plate 8, floating nuts 4, doubler 3, screws 32, then titanium plate 31 and finally expanded metal ring 30 of airplane-skin 20;

or through C3', that is to say through aerodynamic plate 7, sensor 2, screws 5, intermediate plate 8, floating nuts 4, doubler 3, screws 32, titanium plate 31 and finally expanded metal ring 30 and airplane-skin 20.

Irrespective of the course of the lightning current, the latter is dissipated toward the skin of the aircraft, avoiding any risk of introduction of the said current into the network of the aircraft.

In this embodiment, in order to implement the system for dissipating the lightning current, airplane-skin 20 is hollowed out around sensor 2 and the layer of expanded metal 22 is cut out. Next an expanded metal ring 30 is added, then a titanium plate 31. Thus the skin of the aircraft tends to be thickened by adding the titanium plate. In order not to have an overly large non-alignment, the carbon folds of airplane-skin 20 were cut at the ring-shaped plate made of titanium 31. It therefore is necessary that the skin be reinforced locally in order to withstand the structural stresses.

Moreover, in order to respect the aerodynamic non-alignment constraints, metal laminated shims 33, for example made of copper, may be installed between the ring-shaped plate made of titanium 31 and airplane-skin 20, if the drilling means do not provide the required tolerances. These laminated shims 33 form a stack that makes it possible to adjust the height of titanium plate 31 by removing layers of the said laminated shim in order to limit the aerodynamic non-alignment.

In a third embodiment of the dissipating system of the invention, the metal plate is cast with the airplane-skin. This embodiment is shown on FIGS. 8 and 9. In this embodiment, airplane-skin 20 is not drilled in its thickness. The joggle of the skin provided for accommodating the ring-shaped plate made of titanium is implemented during the laying of the airplane-skin in the production mold. The tool then is a female mold.

Figure 8:
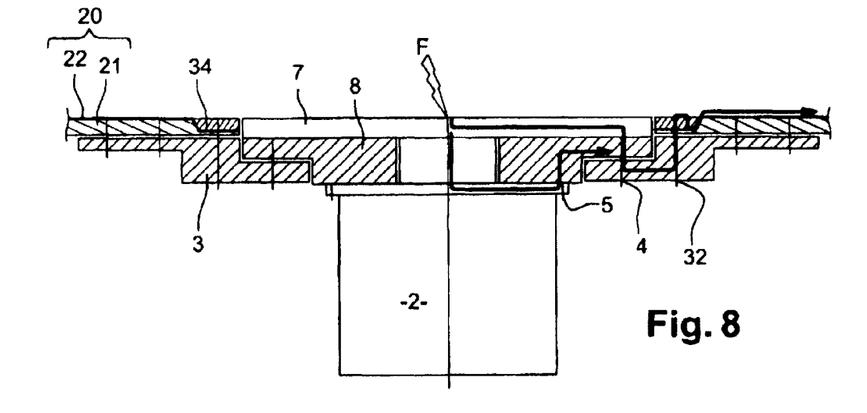
FIG. 8 shows an exemplary system for dissipating the lightning current, on an aircraft with composite structure, according to a third embodiment of the invention.
Figure 9A:
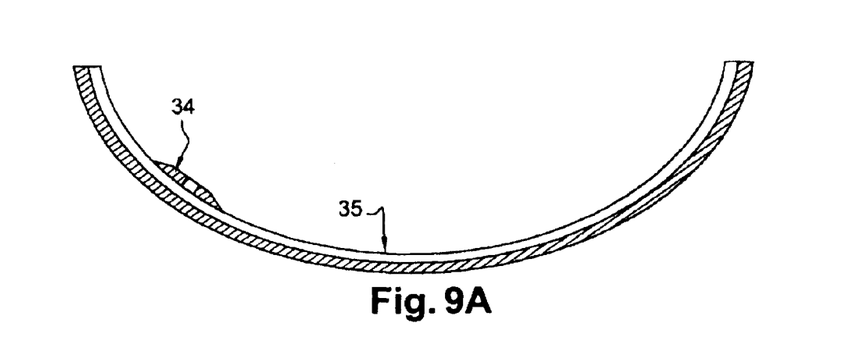
FIGS. 9A and 9B show an exemplary metal plate according to the third embodiment of the invention.
Figure 9B:
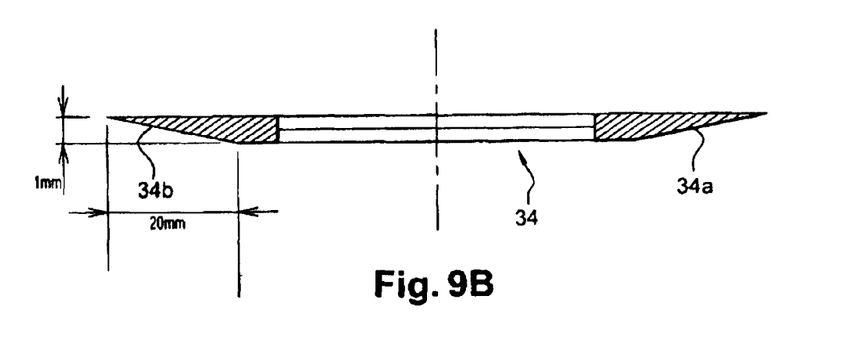

As shown on FIG. 8, a ring-shaped plate made of titanium 34 is positioned around orifice 6, directly in airplane-skin 20. This plate made of titanium 34 was cast beforehand with airplane-skin 20 so that the airplane skin has a form adapted to the contour of the plate made of titanium 34.

An exemplary female mold in which the airplane-skin may be produced has been shown on FIG. 9A. This female mold incorporates the plate made of titanium 34. Once the plate made of titanium has been positioned in mold 35, the carbon folds are positioned inside the mold so that these carbon folds take on the form of the contour of the plate made of titanium 34.

The plate made of titanium 34 may be fastened permanently on the mold. In this case, another plate made of titanium, of more or less identical form, is installed on the airplane-skin with, if necessary, metal laminated shims to limit the aerodynamic non-alignment. In this case, the principle of installation of the plate made of titanium is similar to that of the second embodiment, the plate made of titanium being fastened on doubler 3 by means of screws 32.

The plate made of titanium 34, used on the mold during production of the airplane-skin, may be removed and installed on the said skin. This variant has numerous advantages:

the airplane-skin is cast on the plate made of titanium and the assembly respects the aerodynamic requirements without having to add a laminated shim; there is a correct alignment directly between the skin and the plate made of titanium.

from a structural point of view, the hold-up of the airplane-skin is better because the carbon folds are not cut in order to install the plate made of titanium.

there is an electric continuity directly between the plate made of titanium and the expanded metal layer of the airplane-skin; in other words, the layer of expanded metal 22 of airplane-skin 20 is directly in contact with the plate made of titanium 34, which ensures a less discontinuous electric contact than in the preceding variants;

there is no expanded metal plate to be added, which simplifies production of the system.

An exemplary sizing of the plate made of titanium 34 is shown on FIG. 9B. As is seen on this Figure, the plate made of titanium 34 has ends 34a, 34b that form a slant, this slant making it possible to avoid the formation of bubbles during laying of the carbon skin between each fold. The plate made of titanium may have, for example, a slant over 1 mm of thickness and 20 mm of width, that is to say an angle equal to Arc tan (1/20).

The invention claimed is:

1. A dissipating system for dissipating a lightning current produced by a thunderstorm discharge on an avionic equipment item installed on an outer skin of an aircraft, the outer skin including a composite material covered with a layer of expanded metal and including an orifice in which an aerodynamic plate is positioned, covering the avionic equipment item, the aerodynamic plate being fastened on the outer skin by a doubler plate, the system comprising:

at least one metal plate that is different from the layer of expanded metal, the at least one metal plate at least partially surrounding the aerodynamic plate and mounted so as to ensure an electric continuity between the doubler plate and the layer of expanded metal to ensure a dissipating of the lightning current in the expanded metal layer, wherein the at least one metal plate sandwiches at least part of the outer skin of the aircraft.

2. The dissipating system according to claim 1, wherein the metal plate is a plate made of expanded metal.

3. The dissipating system according to claim 2, wherein the metal plate made of expanded metal sandwiches the at least part of the outer skin of the aircraft by covering at least partially both an upper face of the outer skin and a lower face of the outer skin.

4. The dissipating system according to claim 2, wherein the metal plate made of expanded metal is partially covered with a ring-shaped plate made of titanium or of copper.

5. The dissipating system according to claim 4, wherein the metal plate made of titanium is fastened on the doubler plate by metal screws.

6. The dissipating system according to claim 4, further comprising at least one metal laminated shim positioned between the metal plate and the outer skin to correct an aerodynamic non-alignment between the upper surface of the outer skin and the avionic equipment item.

7. The dissipating system according to claim 2, wherein the metal plate made of expanded metal is pre-impregnated with resin and fastened on the outer skin by heating.

8. The dissipating system according to claim 1, wherein the metal plate is a plate made of titanium cast with the outer skin.

9. A method for installation of a dissipating system for dissipating a lightning current produced by a thunderstorm discharge on an avionic equipment item installed on an outer skin of an aircraft, the outer skin including a composite material covered with a layer of expanded metal and including an orifice in which an aerodynamic plate is positioned, covering the avionic equipment item, the aerodynamic plate being fastened on the outer skin by a doubler plate, the method comprising:
  implementing an orifice in the outer skin of the aircraft;
  installing, around at least one part of the orifice, a metal plate, the installing including sandwiching at least part of the outer skin of the aircraft by the metal plate;
  fastening the metal plate on the outer skin and on a doubler plate; and
  installing an avionic equipment item in the orifice.

10. An aircraft, comprising:
  a dissipating system for dissipating a lightning current produced by a thunderstorm discharge on an avionic equipment item installed on an outer skin of an aircraft, the outer skin including a composite material covered with a layer of expanded metal and including an orifice in which an aerodynamic plate is positioned, covering the avionic equipment item, the aerodynamic plate being fastened on the outer skin by a doubler plate, the dissipating system including
    a metal plate that is different from the layer of expanded metal, the metal plate at least partially surrounding the aerodynamic plate and mounted so as to ensure an electric continuity between the doubler plate and the layer of expanded metal to ensure a dissipating of the lightning current in the expanded metal layer, wherein
  the metal plate sandwiches at least part of the outer skin of the aircraft.

\* \* \* \* \*